(12) United States Patent
Oakey

(10) Patent No.: US 11,214,200 B1
(45) Date of Patent: Jan. 4, 2022

(54) RUNNING BOARD SYSTEM

(71) Applicant: Douglas Oakey, Hudson, FL (US)

(72) Inventor: Douglas Oakey, Hudson, FL (US)

(*) Notice: Subject to any disclaimer, the term of this patent is extended or adjusted under 35 U.S.C. 154(b) by 231 days.

(21) Appl. No.: 16/674,635

(22) Filed: Nov. 5, 2019

Related U.S. Application Data

(60) Provisional application No. 62/760,211, filed on Nov. 13, 2018.

(51) Int. Cl.
B60R 3/02 (2006.01)
B60R 3/00 (2006.01)

(52) U.S. Cl.
CPC .................. B60R 3/002 (2013.01)

(58) Field of Classification Search
CPC ........... B60R 3/00; B60R 3/002; B60R 3/007; B60R 3/02; B62D 37/02; B62D 35/008
See application file for complete search history.

(56) References Cited

U.S. PATENT DOCUMENTS

| | | | | |
|---|---|---|---|---|
| 5,193,829 A * | 3/1993 | Holloway | ............... | B60R 3/002 280/163 |
| 8,403,348 B1 * | 3/2013 | Wang | ..................... | B60R 3/002 280/163 |
| 9,937,865 B1 * | 4/2018 | Oakey | ..................... | B60R 3/002 |
| 10,336,259 B2 * | 7/2019 | Michie | .................... | B60R 3/002 |
| 2003/0011163 A1 * | 1/2003 | Coomber | ............... | B60R 3/002 280/163 |
| 2005/0263974 A1 * | 12/2005 | Mulder | ..................... | B60R 3/00 280/163 |
| 2005/0263975 A1 * | 12/2005 | Mulder | ..................... | B60R 3/04 280/163 |
| 2016/0059786 A1 * | 3/2016 | Montoya | ................ | B60R 3/002 280/163 |
| 2019/0047477 A1 * | 2/2019 | Crandall | ................ | B60Q 1/323 |
| 2019/0092226 A1 * | 3/2019 | Chen | ..................... | B60Q 1/323 |
| 2019/0126832 A1 * | 5/2019 | Knichel | .................. | F16B 7/042 |
| 2021/0213884 A1 * | 7/2021 | Dellock | .................. | B32B 27/08 |

* cited by examiner

Primary Examiner — Bryan A Evans
(74) Attorney, Agent, or Firm — Cargill & Associates, PLLC; Lynn E. Cargill

(57) ABSTRACT

A primary support has an upper surface, a lower surface, an outer surface, and an inner surface. The upper and inner surfaces form an arcuate upper-inner corner. The upper and outer surfaces form an arcuate upper-outer corner. The lower and outer surfaces form an arcuate lower-outer corner. The primary support is extruded of a polymeric material. A decorative panel has an upper region positioned over the upper surface of the primary support with an inner end terminating adjacent to the upper-inner corner. The decorative panel has an outer region positioned over the outer surface of the primary support with a lower end terminating adjacent to the lower-outer corner. The decorative panel has an intermediate region formed arcuately and positioned over the upper-outer corner. The decorative panel is fabricated of a rigid, shiny material.

4 Claims, 4 Drawing Sheets

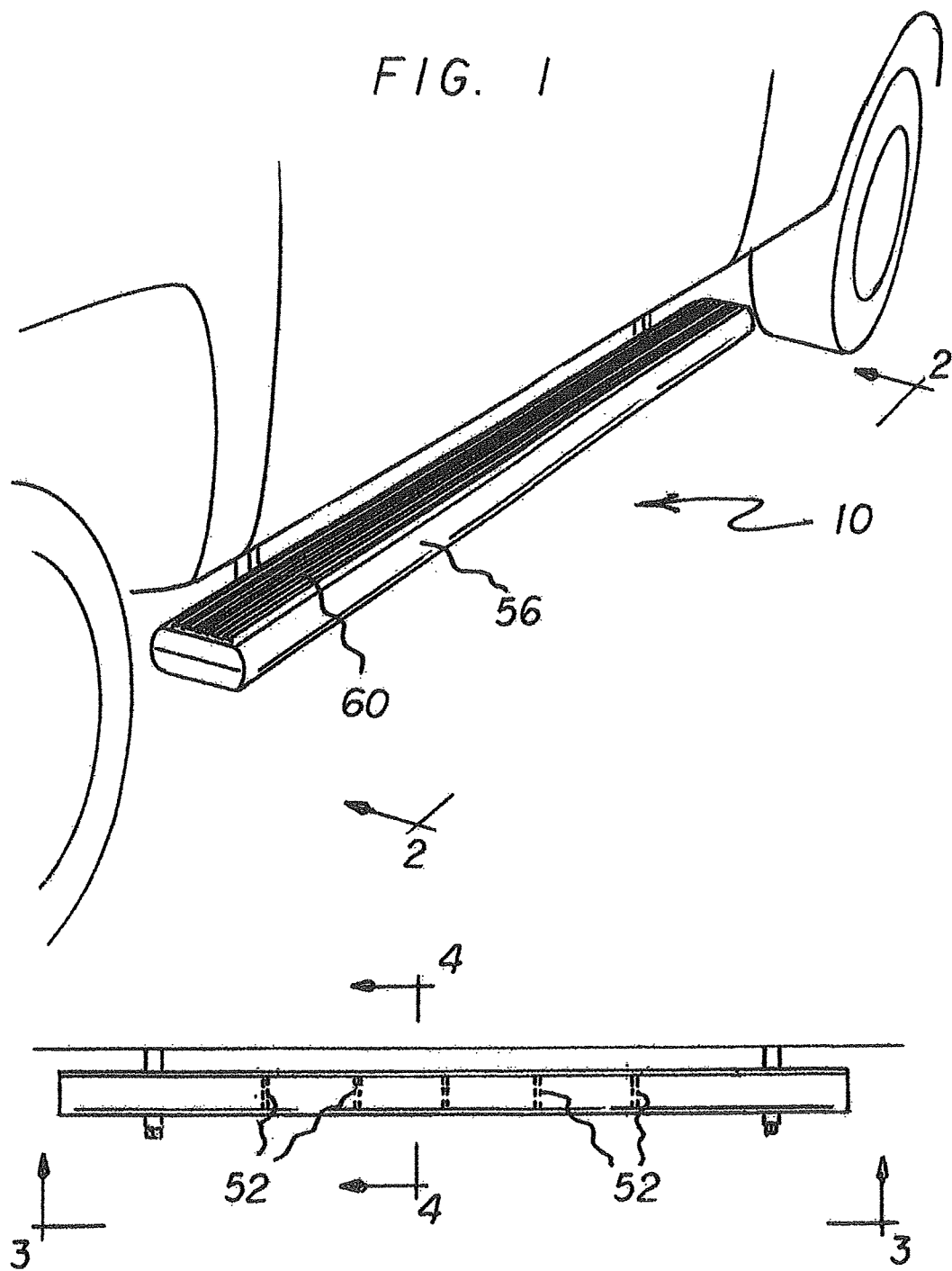

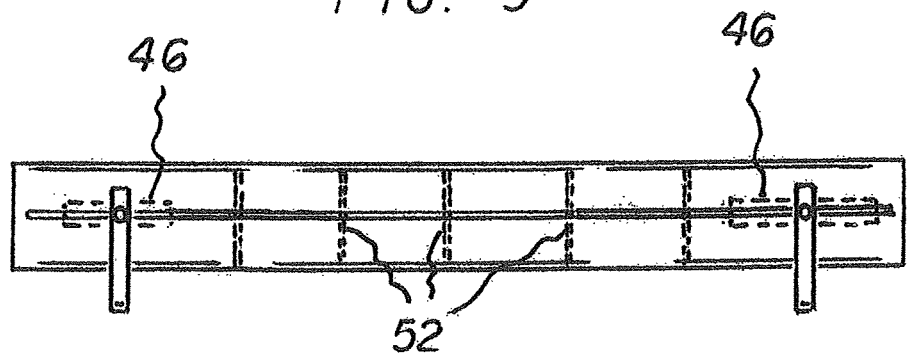
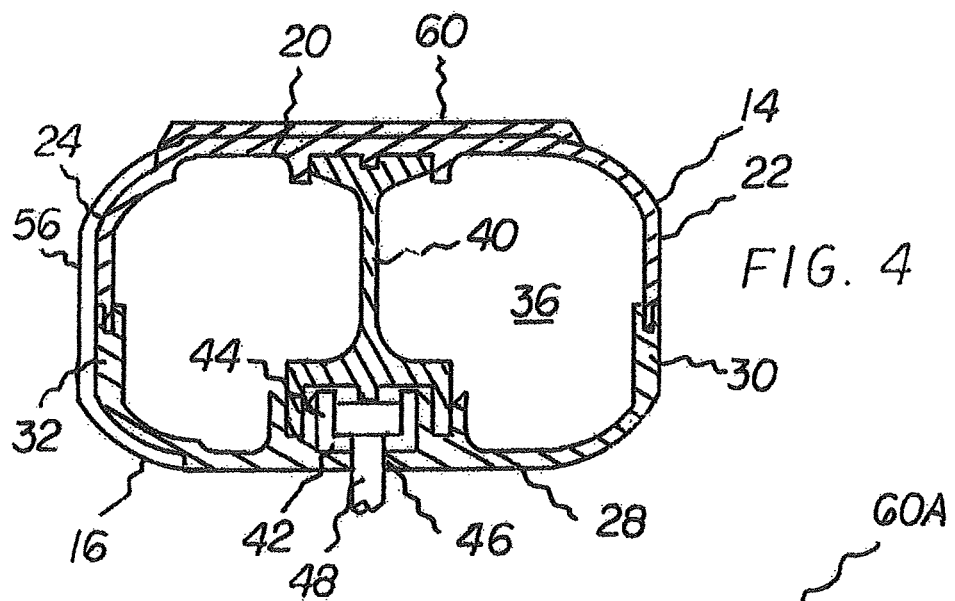
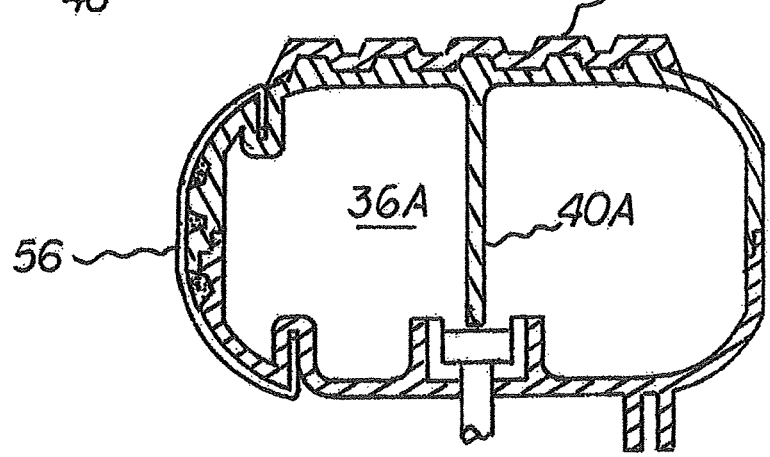

RUNNING BOARD SYSTEM

RELATED APPLICATION

The present invention is based upon Provisional Application No. 62/760,211 filed Nov. 13, 2018, the priority of which is claimed and the subject matter of which is incorporated herein by reference. The present application is also an improvement over my prior invention disclosed and claimed in application Ser. No. 15/618,486 filed Jun. 9, 2017 and issued Apr. 10, 2018 as U.S. Pat. No. 9,937,865, the subject matter of which is incorporated herein by reference.

BACKGROUND OF THE INVENTION

Field of the Invention

The present invention relates to a running board system and more particularly pertains to constituting a vehicle platform for standing upon and for providing a stable step into and from a vehicle, the constituting and the providing being done in a safe, secure, eye-appealing, and economical manner.

SUMMARY OF THE INVENTION

In view of the disadvantages inherent in the known types of step systems now present in the prior art, the present invention provides an improved running board system. As such, the general purpose of the present invention, which will be described subsequently in greater detail, is to provide a new and improved running board system and method which has all the advantages of the prior art and none of the disadvantages.

From a broad viewpoint, the present invention is a running board system comprising a primary support and a declorative panel. The primary support has an upper surface, a lower surface, an outer surface, and an inner surface. The upper and inner surfaces form an arcuate upper-inner corner. The upper and outer surfaces form an arcuate upper-outer corner. The lower and outer surfaces form an arcuate lower-outer corner. The primary support is extruded of a polymeric material. A decorative panel has an upper region positioned over the upper surface of the primary support with an inner end terminating adjacent to the upper-inner corner. The decorative panel has an outer region positioned over the outer surface of the primary support with a lower end terminating adjacent to the lower-outer corner. The decorative panel has an intermediate region formed arcuately and positioned over the upper-outer corner. The decorative panel is fabricated of a rigid, shiny material.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved running board system which has all of the advantages of the prior art step systems and none of the disadvantages.

It is another object of the present invention to provide a new and improved running board system which may be easily and efficiently manufactured and marketed.

It is further object of the present invention to provide a new and improved running board system which is of durable and reliable constructions.

An even further object of the present invention is to provide a new and improved running board system which is susceptible of a low cost of manufacture with regard to both materials and labor, and which accordingly is then susceptible of low prices of sale to the consuming public, thereby making such running board system economically available to the buying public.

Lastly, another object of the present invention is to provide a running board system for constituting a vehicle platform for standing upon and for providing a stable step into and from a vehicle, the constituting and the providing being done in a safe, secure, eye-appealing, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a running board system constructed in accordance with the principles of the present invention.

FIG. 2 is a side elevational view taken along line 2-2 of FIG. 1.

FIG. 3 is a bottom view taken along line 3-3 of FIG. 2.

FIG. 4 is a cross sectional view taken along line 4-4 of FIG. 2.

FIG. 5 is cross sectional view similar to FIG. 4 but illustrating an alternate embodiment of the invention.

The same reference numerals refer to the same parts throughout the various Figures.

DESCRIPTION OF THE PREFERRED EMBODIMENT

Figure 6:
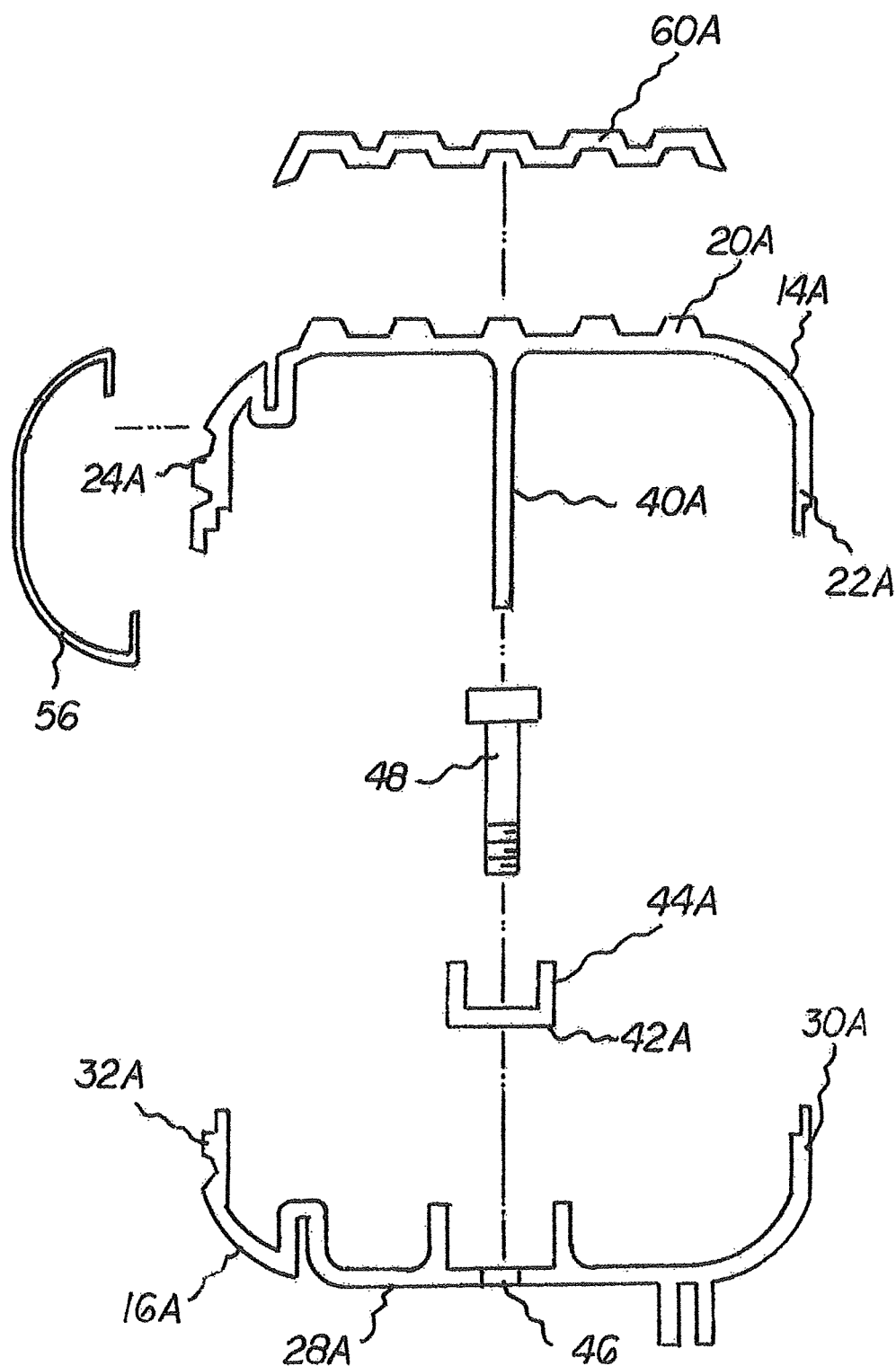
FIG. 6 is an exploded cross sectional view of the system shown in FIG. 5.
Figure 7:
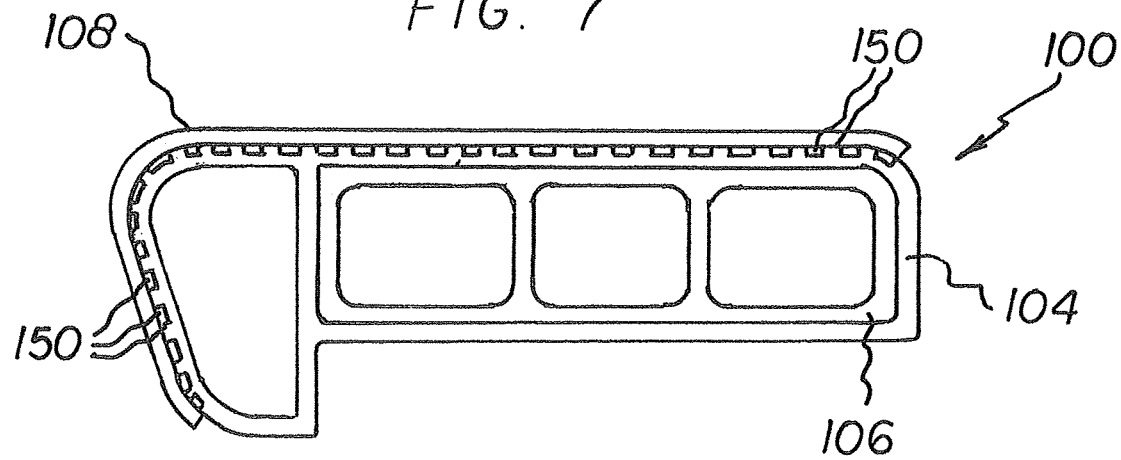
FIG. 7 is a cross sectional view of a running board system constructed in accordance with the final alternate embodiment of the invention.
Figure 8:
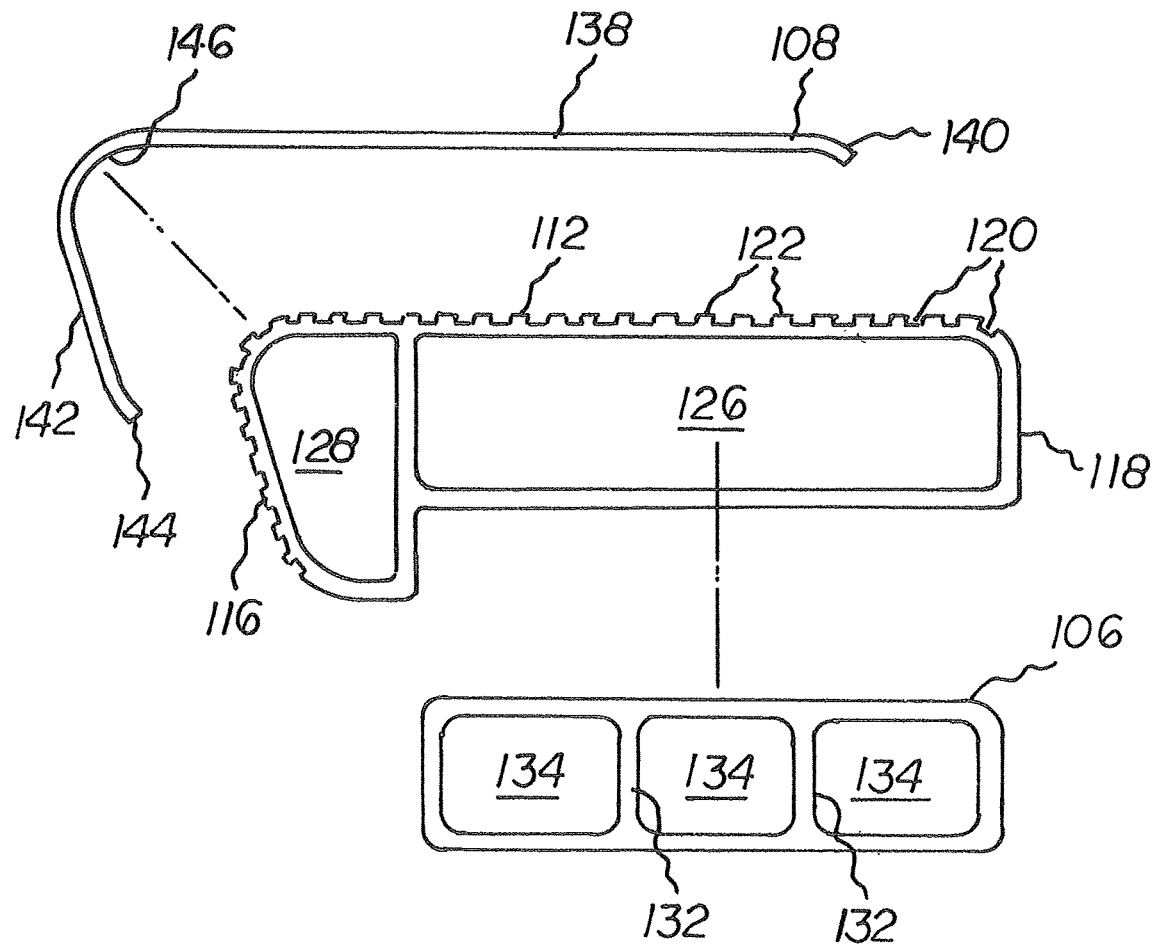
FIG. 8 is an exploded cross sectional view of the running board system shown in FIG. 7.

With reference now to the drawings, and in particular to FIG. 1 thereof, the preferred embodiment of the new and improved running board system embodying the principles and concepts of the present invention and generally designated by the reference numeral 10 will be described.

The present invention, the running board system 10 is comprised of a plurality of components. Such components in their broadest context include an upper component, a lower component, and a support beam. Such components are individually configured and correlated with respect to each other so as to attain the desired objective.

First provided is an upper component 14, 14A. A similarly configured lower component 16, 16A is provided. The upper component and the lower component have a common height, a common width, and a common length. The common height is from 30 to 40 percent of the common width. The common width is from 15 to 25 percent of the common length.

The upper component has a top 20, 20A. The top is horizontally disposed. The upper component has an inner side 22, 22A. The inner side is vertically disposed. The inner side has a lower free end. The upper component has an outer side 24, 24A. The outer side is vertically disposed. The outer side has a lower free end.

The lower component has a bottom 28, 28A. The bottom is horizontally disposed. The lower component has an inner side 30, 30A. The inner side is vertically disposed. The inner side has an upper free end. The lower component has an outer side 32, 32A. The outer side is vertically disposed. The outer side has an upper free end The lower free end of the inner side of the upper component is coupled to the upper free end of the inner side of the lower component. The lower free end of the outer side of the upper component is coupled to the upper free end of the outer side of the lower component. In this manner, a cylindrical configuration is formed. The cylindrical formation has an exterior surface and an interior surface. A chamber 36, 36A is provided within the cylindrical configuration. The chamber has opposed ends. The opposing ends are separated by the length.

A support beam 40, 40A is provided. The support beam is provided within the chamber. The support beam extends vertically. The support beam extends to the opposed ends of the chamber. The support beam has an upper end. The upper end is adjacent to the top. The support beam has a lower end. The lower end is adjacent to the bottom. The lower end is spaced from the bottom. Two U-shaped channels 42, 42A are provided. The U-shaped channels are provided within the housing. The U-shaped channels extend upwardly from the bottom. The U-shaped channels are adjacent to the opposed ends of the chamber.

Each U-shaped channel has walls 44, 44A. The walls are laterally spaced. A space is formed between the walls. The lower end of the support beam is located within the spaces. Two slots 46, 46A are provided. The slots are provided in the bottom between the walls. Two bolts 48, 48A are provided. The two bolts extend through the two slots respectively. Each bolt has a lower end. Each lower end of each bolt is below the bottom. The lower end of each bolt being below the bottom enables the bolt to be coupled to the vehicle. Each bolt has an upper end. The upper end of each bolt is in a space. In this manner each upper end of each bolt is held in place by the support beam.

A plurality of bulkheads 52 is provided next. The bulkheads are provided within the chamber. The bulkheads are provided between the bolts. The bulkheads contact the top and the bottom. In this manner, added strength is provided to the system. The upper component, the lower component, the support beam, and the U-shaped channel are fabricated of a rigid material.

A decorative panel 56, 56A is provided. The decorative panel is coupled to the outer side of the upper component and to the outer side of the lower component. The decorative panel is fabricated of a shiny material. The shiny material has an appearance of chrome.

Further provided is an anti-slip piece 60, 60A. The anti-slip piece is secured to the exterior surface of the top. The anti-slip piece is fabricated of an anti-slip elastomer. In this manner a person slipping is abated when they step on the system.

The final and preferred embodiment of the invention is a running board system 100 constituting an eye-appealing vehicle platform for standing upon and for providing a stable step into and from a vehicle. First provided are a primary support 104, a secondary support 106, and a decorative panel 108.

The primary support 104 has a generally horizontal upper surface 112 and a generally horizontal lower surface 114. The primary support has an outer surface 116 and an inner surface 118. The inner surface extends vertically downwardly from the upper surface. The outer surface extends downwardly and inwardly at an angle from the upper surface. The upper surface and the outer surface are formed with parallel recesses 120 and parallel projections 122. A primary bulkhead 124 extends vertically within the primary support closer to the outer surface than to the inner surface thereby forming a major chamber 126 and a minor chamber 128. The major chamber has a height and a width. The width is greater than the height. The minor chamber has a height and a width. The height is greater than the width. The upper surface and the inner surface form an arcuate upper-inner corner. The upper surface and the outer surface form an arcuate upper-outer corner. The lower surface and the outer surface form an arcuate lower-outer corner.

The secondary support 106 has a horizontal upper surface, a horizontal lower surface, a vertical outer surface, and a vertical inner surface. A plurality of secondary bulkheads 132 extend vertically within the secondary support thereby forming a plurality of secondary chambers 134.

The primary and secondary supports are extruded of a polymeric material chosen from the class of polymeric materials including fiberglass, nylon, glass filled nylon, and a composite.

The decorative panel 108 has an upper region 138 formed linearly over the majority of its extent with an inner end terminating in a downwardly turned arcuate configuration positioned over a portion of the upper-inward corner. The decorative panel 108 has an outer region 142 formed linearly over the majority of its extent with a lower end 144 terminating in an inwardly turned arcuate configuration positioned over a portion of the lower-outward corner. The decorative panel 108 has an intermediate region 146 formed arcuately over the upper-outward corner. The decorative panel is formed of a rigid, shiny material chosen from the class of rigid, shiny materials including aluminum, stainless steel, and a shiny polymer.

Lastly, an adhesive 150 couples the decorative panel and the primary support. The coupling of the decorative panel and the primary support may alternatively be done with threaded fasteners or any of a variety of couplers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A running board system comprising:
    a primary support having an upper surface, a lower surface, an outer surface, and an inner surface, the upper surface and the inner surface forming an arcuate upper-inner corner, the upper surface and the outer surface forming an arcuate upper-outer corner, the lower surface and the outer surface forming an arcuate lower-outer corner, the primary support being extruded of a polymeric material; and
    a decorative panel having an upper region positioned over the upper surface of the primary support with an inner end terminating adjacent to the upper-inward corner, the decorative panel having an outer region positioned over the outer surface of the primary support with a lower end terminating adjacent to the lower-outward corner, the decorative panel 108 having an intermediate region formed arcuately and positioned over the upper-outward corner, the decorative panel being fabricated of a rigid, shiny material.

2. The system as set forth in claim 1 and further including a secondary support positioned within the primary support.

3. The system as set forth in claim 1 and further including an adhesive coupling the decorative panel and the primary support.

4. A running board system (100) constituting an eye-appealing vehicle platform for standing upon and for providing a stable step into and from a vehicle, the system comprising, in combination:

a primary support (104), a secondary support (106), and a decorative panel (108), the primary support having a generally horizontal upper surface (112) and a generally horizontal lower surface (114), the primary support having an outer surface 116 and an inner surface (118), the inner surface extending vertically downwardly from the upper surface, the outer surface extending downwardly and inwardly at an angle from the upper surface, the upper surface and the outer surface being formed with parallel recesses (120) and parallel projections (122), a primary bulkhead (124) extending vertically within the primary support closer to the outer surface than to the inner surface thereby forming a major chamber (126) and a minor chamber (128), the major chamber having a height and a width with the width being greater than the height, the minor chamber having a height and a width with the height being greater than the width, the upper surface and the inner surface forming an arcuate upper-inner corner, the upper surface and the outer surface forming an arcuate upper-outer corner, the lower surface and the outer surface forming an arcuate lower-outer corner;

the secondary support (106) having a horizontal upper surface and a horizontal lower surface and a vertical outer surface and a vertical inner surface, a plurality of secondary bulkheads (132) extending vertically within the secondary support thereby forming a plurality of secondary chambers (134), the primary and secondary supports being extruded of a polymeric material chosen from the class of polymeric materials including fiberglass, nylon, glass filled nylon, and a composite;

the decorative panel (108) having an upper region (138) formed linearly over the majority of its extent with an inner end terminating in a downwardly turned arcuate configuration positioned over a portion of the upper-inward corner, the decorative panel (108) having an outer region (142) formed linearly over the majority of its extent with a lower end (144) terminating in an inwardly turned arcuate configuration positioned over a portion of the lower-outward corner, the decorative panel (108) having an intermediate region (146) formed arcuately over the upper-outward corner, the decorative panel being formed of a rigid, shiny material chosen from the class of rigid, shiny materials including aluminum, stainless steel, and a shiny polymer; and an adhesive (150) coupling the decorative panel and the primary support.

* * * * *